(12) United States Patent
Vazac et al.

(10) Patent No.: US 9,785,533 B2
(45) Date of Patent: Oct. 10, 2017

(54) SESSION TEMPLATE PACKAGES FOR AUTOMATED LOAD TESTING

(75) Inventors: Charles A. Vazac, San Francisco, CA (US); Tana Christine Jackson, San Francisco, CA (US); Tal Broda, Sunnyvale, CA (US); Kendall Cosby, Aurora, CA (US)

(73) Assignee: SOASTA, Inc., Mountain View, CA (US)

( * ) Notice: Subject to any disclaimer, the term of this patent is extended or adjusted under 35 U.S.C. 154(b) by 0 days.

(21) Appl. No.: 13/317,440

(22) Filed: Oct. 18, 2011

(65) Prior Publication Data

US 2013/0097307 A1 Apr. 18, 2013

(51) Int. Cl.
G06F 15/173 (2006.01)
G06F 11/34 (2006.01)
H04L 12/26 (2006.01)

(52) U.S. Cl.
CPC ...... *G06F 11/3433* (2013.01); *G06F 11/3414* (2013.01); *H04L 43/14* (2013.01); *H04L 43/50* (2013.01); *G06F 11/3476* (2013.01); *G06F 2201/875* (2013.01)

(58) Field of Classification Search
CPC ........ G06F 15/173; H04L 29/06; H04L 43/00
USPC ................. 709/224, 227; 715/700
See application file for complete search history.

(56) References Cited

U.S. PATENT DOCUMENTS

| | | | |
|---|---|---|---|
| 5,414,809 A | 5/1995 | Hogan et al. | |
| 5,615,347 A | 3/1997 | Davis et al. | |
| 5,724,525 A | 3/1998 | Beyers et al. | |
| 5,945,986 A | 8/1999 | Bargar et al. | |
| 6,025,853 A | 2/2000 | Baldwin | |
| 6,092,043 A | 7/2000 | Squires et al. | |
| 6,134,582 A | 10/2000 | Kennedy | |
| 6,317,786 B1 | 11/2001 | Yamane et al. | |
| 6,434,513 B1 | 8/2002 | Sherman et al. | |
| 6,477,483 B1 | 11/2002 | Scarlat et al. | |

(Continued)

OTHER PUBLICATIONS

Chester et al., "Mastering Excel 97", 1994, Sybex, 4th Ed., pp. 1016, 136-137, 430, 911, 957-958.

(Continued)

*Primary Examiner* — Vivek Srivastava
*Assistant Examiner* — Sibte Bukhari
(74) *Attorney, Agent, or Firm* — The Law Offices of Bradley J. Bereznak

(57) ABSTRACT

A computer-implemented method includes scanning a clip of messages that includes message requests and message responses arranged in a sequence. The scanning is performed based on one or more search parameters and produces a list of one or more name/value pairs. The clip is utilized to perform a load test on a target website. Each name/value pair has a corresponding value. For each name/value pair in the list a message request in the clip is identified where the corresponding value is first used. Then, looking backwards in the sequence from the message request where the corresponding value is first used, prior message responses are located where the corresponding value is found. An extraction point is specified in the clip for the corresponding value as a latest message response in the sequence where the corresponding value was returned from the target website. The corresponding value is then stored as a property.

10 Claims, 11 Drawing Sheets

(56) References Cited

U.S. PATENT DOCUMENTS

| | | | |
|---|---|---|---|
| 6,542,163 B2 | 4/2003 | Gorbet et al. |
| 6,560,564 B2 | 5/2003 | Scarlat et al. |
| 6,563,523 B1 | 5/2003 | Suchocki et al. |
| 6,601,020 B1 | 7/2003 | Myers |
| 6,738,933 B2 | 5/2004 | Fraenkel et al. |
| 6,775,644 B2 | 8/2004 | Myers |
| 6,792,393 B1 | 9/2004 | Farel et al. |
| 6,817,010 B2 | 11/2004 | Aizenbud-Reshef et al. |
| 6,898,556 B2 | 5/2005 | Smocha et al. |
| 6,959,013 B1 | 10/2005 | Muller et al. |
| 6,975,963 B2 | 12/2005 | Hamilton et al. |
| 7,050,056 B2 | 5/2006 | Meyringer |
| 7,133,805 B1 | 11/2006 | Dankenbring et al. |
| 7,216,168 B2 | 5/2007 | Merriam |
| 7,334,162 B1 | 2/2008 | Vakrat et al. |
| 7,376,902 B2 | 5/2008 | Lueckhoff |
| 7,464,121 B2 | 12/2008 | Barcia et al. |
| 7,478,035 B1 | 1/2009 | Wrench et al. |
| 7,548,875 B2 | 6/2009 | Mikkelsen et al. |
| 7,587,638 B2 | 9/2009 | Shah et al. |
| 7,594,238 B2 | 9/2009 | Takahashi |
| 7,607,169 B1 | 10/2009 | Njemanze |
| 7,617,201 B1 | 11/2009 | Bedell et al. |
| 7,630,862 B2 | 12/2009 | Glas et al. |
| 7,685,234 B2 | 3/2010 | Gottfried |
| 7,689,455 B2 | 3/2010 | Fligler et al. |
| 7,693,947 B2 | 4/2010 | Judge et al. |
| 7,725,812 B1 | 5/2010 | Balkus et al. |
| 7,743,128 B2 | 6/2010 | Mullarkey |
| 7,757,175 B2 | 7/2010 | Miller |
| 7,844,036 B2 * | 11/2010 | Gardner et al. ........... 379/88.08 |
| 7,965,643 B1 | 6/2011 | Gilbert et al. |
| 8,015,327 B1 | 9/2011 | Zahavi et al. |
| 8,166,458 B2 | 4/2012 | Li et al. |
| 8,291,079 B1 | 10/2012 | Colton et al. |
| 8,306,195 B2 | 11/2012 | Gardner et al. |
| 8,341,462 B2 | 12/2012 | Broda et al. |
| 8,448,148 B1 | 5/2013 | Kolawa et al. |
| 8,464,224 B2 | 6/2013 | Dulip et al. |
| 8,479,122 B2 | 7/2013 | Hotelling et al. |
| 8,510,600 B2 | 8/2013 | Broda et al. |
| 8,583,777 B1 | 11/2013 | Boyle et al. |
| 9,021,362 B2 | 4/2015 | Broda et al. |
| 9,154,611 B1 | 10/2015 | Jackson et al. |
| 9,229,842 B2 | 1/2016 | Broda et al. |
| 9,251,035 B1 | 2/2016 | Vazac et al. |
| 2002/0107826 A1 * | 8/2002 | Ramachandran ........ G09B 5/08 706/49 |
| 2002/0138226 A1 | 9/2002 | Doane |
| 2002/0147937 A1 | 10/2002 | Wolf |
| 2003/0074161 A1 | 4/2003 | Smocha et al. |
| 2003/0074606 A1 | 4/2003 | Boker |
| 2003/0109951 A1 | 6/2003 | Hsiung et al. |
| 2003/0130982 A1 | 7/2003 | Kasriel et al. |
| 2003/0195960 A1 | 10/2003 | Merriam |
| 2004/0010584 A1 | 1/2004 | Peterson et al. |
| 2004/0039550 A1 | 2/2004 | Myers |
| 2004/0059544 A1 | 3/2004 | Smocha et al. |
| 2004/0064293 A1 | 4/2004 | Hamilton et al. |
| 2004/0119713 A1 | 6/2004 | Meyringer |
| 2004/0123320 A1 | 6/2004 | Daily et al. |
| 2004/0205724 A1 | 10/2004 | Mayberry |
| 2005/0027858 A1 | 2/2005 | Sloth et al. |
| 2005/0102318 A1 | 5/2005 | Odhner et al. |
| 2005/0182589 A1 | 8/2005 | Smocha et al. |
| 2005/0216234 A1 | 9/2005 | Glas et al. |
| 2005/0278458 A1 | 12/2005 | Berger et al. |
| 2006/0031209 A1 | 2/2006 | Ahlberg et al. |
| 2006/0036987 A1 * | 2/2006 | Ali ............... G06F 17/5068 716/122 |
| 2006/0075094 A1 | 4/2006 | Wen et al. |
| 2006/0229931 A1 | 10/2006 | Fligler et al. |
| 2006/0271700 A1 | 11/2006 | Kawai et al. |
| 2007/0143306 A1 | 6/2007 | Yang |
| 2007/0232237 A1 | 10/2007 | Croak et al. |
| 2007/0282567 A1 | 12/2007 | Dawson et al. |
| 2007/0283282 A1 | 12/2007 | Bonfiglio et al. |
| 2007/0288205 A1 | 12/2007 | Vazquez et al. |
| 2008/0049641 A1 | 2/2008 | Edwards et al. |
| 2008/0059947 A1 | 3/2008 | Anand et al. |
| 2008/0066009 A1 | 3/2008 | Gardner et al. |
| 2008/0140347 A1 | 6/2008 | Ramsey et al. |
| 2008/0147462 A1 | 6/2008 | Muller |
| 2008/0189408 A1 * | 8/2008 | Cancel et al. ............... 709/224 |
| 2009/0077107 A1 | 3/2009 | Scumniotales et al. |
| 2009/0271152 A1 | 10/2009 | Barrett |
| 2009/0300423 A1 | 12/2009 | Ferris |
| 2010/0023867 A1 | 1/2010 | Coldiron et al. |
| 2010/0057935 A1 | 3/2010 | Kawai et al. |
| 2010/0115496 A1 | 5/2010 | Amichai |
| 2010/0198960 A1 | 8/2010 | Kirschnick et al. |
| 2010/0250732 A1 | 9/2010 | Bucknell |
| 2010/0251128 A1 | 9/2010 | Cordasco |
| 2010/0333072 A1 | 12/2010 | Dulip et al. |
| 2011/0066892 A1 | 3/2011 | Gardner et al. |
| 2011/0119370 A1 | 5/2011 | Huang et al. |
| 2011/0130205 A1 | 6/2011 | Cho et al. |
| 2011/0191465 A1 | 8/2011 | Hofstaedter et al. |
| 2011/0202517 A1 * | 8/2011 | Reddy et al. ............... 707/706 |
| 2011/0282642 A1 | 11/2011 | Kruger et al. |
| 2012/0017165 A1 | 1/2012 | Gardner et al. |
| 2012/0017210 A1 | 1/2012 | Huggins et al. |
| 2012/0101799 A1 | 4/2012 | Fernandes |
| 2012/0166634 A1 | 6/2012 | Baumback et al. |
| 2012/0246310 A1 | 9/2012 | Broda et al. |
| 2012/0314616 A1 | 12/2012 | Hong et al. |
| 2013/0031449 A1 | 1/2013 | Griffiths et al. |
| 2013/0097307 A1 | 4/2013 | Vazac et al. |
| 2013/0116976 A1 | 5/2013 | Kanemasa et al. |
| 2014/0033055 A1 | 1/2014 | Gardner et al. |
| 2014/0189320 A1 | 7/2014 | Kuo |
| 2014/0280880 A1 | 9/2014 | Tellis et al. |
| 2015/0067527 A1 | 3/2015 | Gardner et al. |

OTHER PUBLICATIONS

Dillenseger, "CLIF, a framework based on Fractal for flexible, distributed load testing" Nov. 18, 2008, Ann. Telecommun., 64:101-120.

Malan et al. "An Extensible Probe Architecture for Network Protocol Performance Measurement", IEEE, Oct. 1998, pp. 215-227.

Jamin et al. "A Measurement-Based Admission Control Algorithm for Integrated Service Packet Networks", IEEE, 1997, pp. 56-70.

* cited by examiner

Applying Session Templates

35 Session Templates Applied.

| Template Name | Name | Extracted Value | Found in Response | Used in Request(s) |
|---|---|---|---|---|
| s_crb (5) (S...late Package) | _s_crb | | | |
| s_crb (2) (S...late Package) | _s_crb | zgC2%252ff3cDMq4Y1QLht%252f2ACSo0%253d | login | login |
| inbox_fmid (S...late Package) | inbox_fmid | 1361133 | acme | acme (+2) |
| myfsub_title (...late Package) | myfsub_title | Performance Review for User11 User11 | acme | acme (+2) |
| document (S...ate Package) | documentId | 1361129 | acme | acme (+1) |
| fb_auto_save...ate Package) | fb_auto_s...fidmapid | 1361133 | acme | acme (+1) |
| myfsub_pm_tk (k...ate Package) | myfsub_pm_tk | -298153346997340531689...94407924317700802387 | acme | acme |
| httpSessionId...late Package) | httpSessionId | lfxK6BACw9bP0A00ohoAQg**.dc1sfapp07e | login (1) | todoPortletControlle...getTodoListData.dwr (+1 |
| javax_faces_v...late Package) | javax_faces_viewstate | j_id:j_id5 | home.xhtml | todoPortletControllerP...etTodoListData.dwr (1 |
| inbox%5ff0f%...ate Package) | inbox%5ff...st%5ffmid | 1361133 | pmreviews | acme |
| javax_faces_v...late Package) | javax_faces_viewstate | j_id1:j_id2 | home.xhtml | todoPortletControlle...getTodoListData.dwr (_+2 |
| fb2wk_form_p...ate Package) | fb2wk_form_p_user | user11 | acme | acme |

Backup Clip: /Concerto UI Tests/Session Templates/Test Data/SuccessFactors copy backup from Thu Sep 15 13:21:54 PDT 2011

SESSION TEMPLATE PACKAGES FOR AUTOMATED LOAD TESTING

TECHNICAL FIELD

The present disclosure relates generally to cloud computing; more specifically, to automated systems and methods for functional and/or load testing of websites or features of message-based, intranet, Internet, or browser-based applications.

BACKGROUND

Individuals and companies today are increasingly reliant on information and commerce conducted over widely accessible electronic communications networks, such as the Internet. To be successful, a business engaged in electronic commerce with consumer-facing websites must ensure a high level of website performance under normal, as well as extreme traffic conditions. External events, such as a natural disaster, or certain calendar dates, such as the Super Bowl, Cyber-Monday, Tax Day, or Valentine's Day, can drive large numbers of users to a website, thus increasing the traffic load immensely. Many information technology systems begin to deny service, or fail to process message traffic efficiently, when communications traffic exceeds a processing capacity of the system. Such failures in communication can significantly impair the operations of an enterprise in many ways. For example, slower website performance is known to cause users/visitors to leave the website sooner. Another consequence of poor performance is that the website may be downgraded in search engine results rankings. A business enterprise can thus suffer losses in immediate and future sales, advertising revenue, and customer loyalty if their website responds in a slow manner—or worse, if the site crashes under the increased load.

In recent years, enterprises and developers have sought an easy and affordable way to use cloud computing as a way to load and performance test web sites and web-based applications. Cloud computing gets its name from the fact that the machine, storage, and application resources exist on a "cloud" of servers. In cloud computing shared resources, software and information are provided on-demand, like a public utility, via the Internet. Cloud computing is closely related to grid computing, which refers to the concept of interconnecting networked computers such that processing power, memory and data storage are all community resources that authorized users can utilize for specific tasks.

Load testing a web-based application or website typically involves simulating a very large number (e.g., up to or beyond 1,000,000) of virtual website users via Hypertext Transfer Protocol (HTTP) or HTTP Secure (HTTPS) message intercommunications with the target website. By way of background, U.S. Pat. No. 7,844,036 describes a software tool which allows a user to efficiently compose and execute a message-based load test on a target website. The user is provided with a graphical user interface (GUI) that can be used to generate a test composition comprising a plurality of message clips organized into one or more tracks. Each clip typically includes a plurality of messages, with each track being organized into one or more bands. Each track and each band may run contemporaneously to send messages to a target device or application. In this manner, a user may create complex message streams containing thousands of messages that are played out according to a particular sequence, timing, and tempo to test the performance of a website.

One of the problems with existing load testing approaches is that when using a gateway application (commonly referred to as a gateway session) a token or value (also referred to as a property in the present application) is typically produced by the server associated with the target website. Such parametric values are commonly produced to authenticate the user. After the website server sends a token or value to a user, subsequent requests to the website need to send the same value or token back to the server to maintain communications.

Another difficulty that arises with generating a load test comprising thousands of virtual users is that the values sent from the target website to each user change dynamically. Values sent to each virtual user from a target website for each thread of execution need to be propagated or substituted back into subsequent messages communicated to the website in order to make the test run properly. If a wrong value is sent back to the target website, the load test will fail. In the past, this has necessitated a very tedious, error-prone, and labor-intensive process wherein a performance engineer is required to manually scan through a failed load test session recording to identify where in a message clip a particular value was received from a target website.

BRIEF DESCRIPTION OF THE DRAWINGS

The present disclosure will be understood more fully from the detailed description that follows and from the accompanying drawings, which however, should not be taken to limit the invention to the specific embodiments shown, but are for explanation and understanding only.

FIG. 3 is an example graphical user interface window that presents a user with a number of options for scanning a clip for session state.

FIG. 4 is an example graphical user interface window that presents the results of the automated scan of the clip as a listing of name/value pairs found in recorded responses and subsequent recorded requests.

FIG. 10 is an example graphical user interface window showing the results following application of a session template package to a test clip.

DETAILED DESCRIPTION

Figure 1:
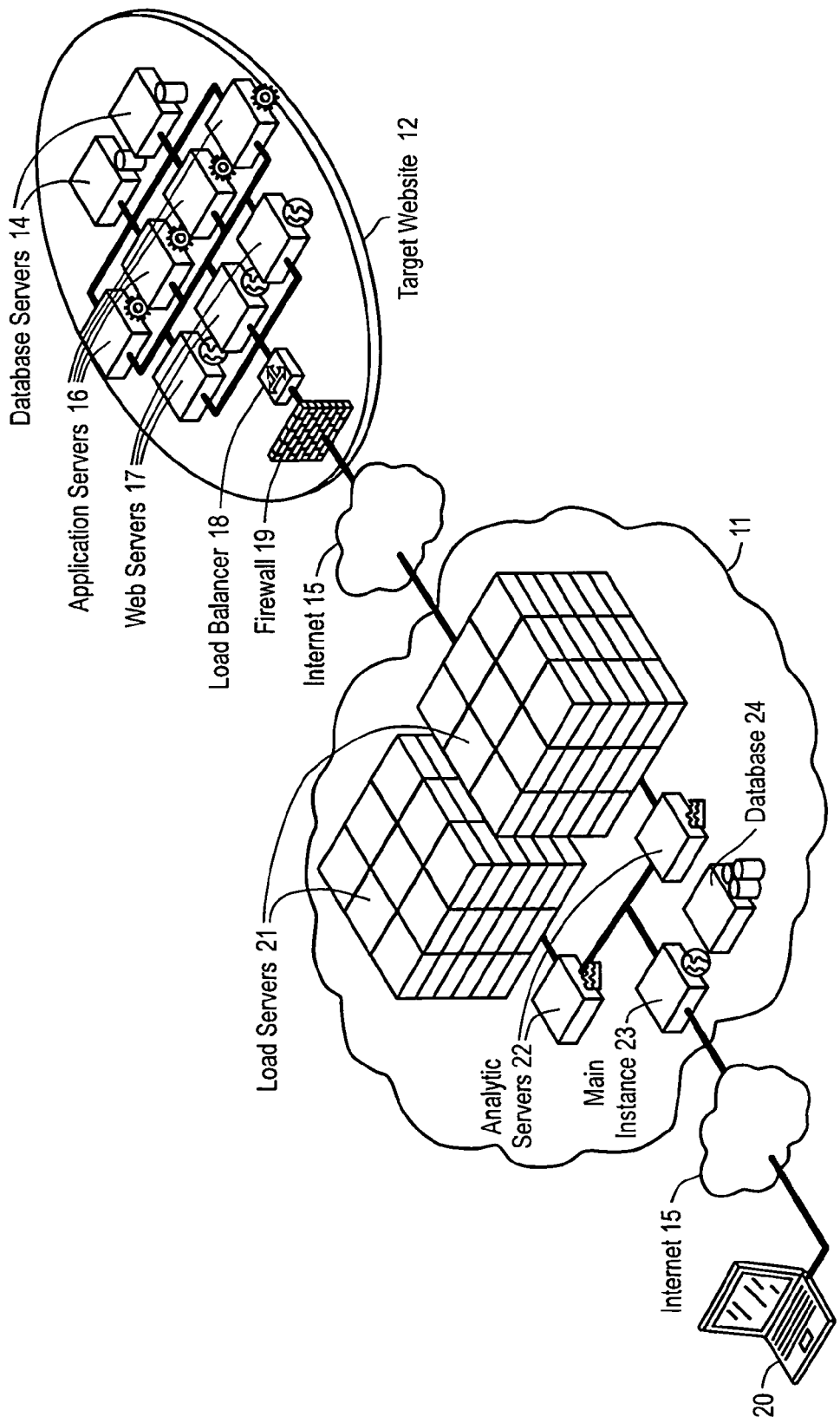
FIG. 1 illustrates an example high level architectural diagram of an in-progress load test of a target website.

In the following description specific details are set forth, such as server types, parametric values, message response types, structural features, method steps, etc., in order to provide a thorough understanding of the subject matter disclosed herein. However, persons having ordinary skill in the relevant arts will appreciate that these specific details may not be needed to practice the present invention. It should also be understood that the elements in the figures are representational, and are not drawn to scale in the interest of clarity.

References throughout this description to "one embodiment", "an embodiment", "one example" or "an example" means that a particular feature, structure or characteristic described in connection with the embodiment or example is included in at least one embodiment. The phrases "in one embodiment", "in an embodiment", "one example" or "an example" in various places throughout this description are not necessarily all referring to the same embodiment or example. Furthermore, the particular features, structures or characteristics may be combined in any suitable combinations and/or sub-combinations in one or more embodiments or examples.

In the context of the present disclosure, the term "cloud" broadly refers to a collection of machine instances, storage and/or network devices that work together in concert.

A "message" generally refers to a unit of data that can be sent via an electronics communications network, e.g., the Internet, to another computational or communications system or device, e.g., to a server. By way of example, a message could represent a communication sent to a queuing system, a REST call, or a HTTP request. A message could also be instantiated entirely or partially as a single operation, such as a web service call in any one of a variety of forms, e.g., XML, JMS, HTML, JSON, etc.

A "message clip" (or "clip" for short) comprises a set of one or more messages that includes a specification of the timing and/or dependencies within that set of messages. A clip typically comprises a plurality (e.g., hundreds of thousands) of sequenced messages that form part of a larger load test composition.

The term "server" broadly refers to any combination of hardware or software embodied in a computer (i.e., a machine "instance") designed to provide services to client devices or processes. A server therefore can refer to a computer residing on a network (i.e., a network node). The server runs a server operating system from computer-executable code stored in a memory, and which is provided to the user as virtualized or non-virtualized server; it can also refer to any software or dedicated hardware capable of providing computing services.

In the context of the present disclosure, "load" servers (also referred to as "test" servers) are servers deployed and utilized primarily to generate a test load on a target website. That is, load servers play the test composition, generating a load on a target (customer) website and web applications. Load servers also function to report back results of the load test and statistics in real-time. "Analytic" or "result" servers are deployed and utilized primarily to collect the real-time test results from the load servers, aggregate those results, stream the results to real-time dashboards, and store them in a database.

The term "real-time" refers to a level of computer responsiveness that a user senses as sufficiently immediate or that enables the computer to keep up with some external process (for example, to present visualizations of load test results as it constantly changes). Thus, real-time is a mode of computer operation in which the computer collects data, analyzes or computes with the data, reports (e.g., visually displays) and/or stores the results nearly simultaneously, i.e., within milliseconds or microseconds.

Run-time refers to the time during which a program is executing, or, in the case of a load test composition, when the composition is being played. In other words, when a user starts a program that runs on a processor-based system or computer, it is run-time for that program.

A "grid" or "test grid" refers to a collection of interconnected load servers and result servers that may be used to run a load test on a target website or web applications. As disclosed herein, a computer program or grid wizard may be utilized to automatically determine the global, cross-cloud, resources needed to execute a test by examining the test plan or script (also referred to as a test composition). Furthermore, the computer program can automatically allocate those server resources required for the test across multiple different cloud providers; verifies that the allocated servers are operational; and that the allocated servers are running proprietary load testing software or computer program product correctly. The computer program or product also monitors the allocated servers, replacing non-operational servers (when allocated, and during execution of the test) and displays results from multiple globally distributed clouds in a real-time streaming dashboard which requires no user initiated refresh.

Parameters, represented as name/value pairs are used in message request and response exchanges between browsers (or load servers) and website servers. The value portion of the name/value pair can be an alphanumeric string or globally unique identifier (GUID) of arbitrary length that can be dynamically generated at runtime by a website server. For instance, a name/value pair may take the form of "A=B", where "A" is the name and "B" is the value. Name/value pairs are built from the requests, whereas values are retrieved from responses.

In the context of the present disclosure, a "session template" or "template" is defined as logic (e.g., an algorithm embodied as code) encoded in a routine that is used to extract a single value in a message of a recorded load test session. The logic identifies a point or location in the message or clip where the single value is extracted. In one embodiment, a session template can be created from a message response's selected text using a session template wizard, which generates a GUI that allows the user to implement and execute the various methods and steps described herein.

A "session template package" denotes a collection of session templates grouped together and identified by a name or descriptor.

The term "property" broadly refers to attributes associated with a message or other object. In the example embodiments described, a property may be considered to be a program variable associated with a particular message or object. Properties may thus be used to pass values to other objects, substitute the values into messages to be sent, implement conditional logic within a given composition or clip, validate received responses, and so forth.

In one embodiment, an automated tool (wizard) provides a GUI that allows a user to specify settings for the automated scan of the recorded requests and responses of a message clip. Using various fields provided in the GUI, the user can specify the strings or items that the scanner searches for in the message clip. While scanning does not alter or change the message clip itself, the scanning process does produce a list of name/value pairs. Values that are provided by the website in a response and which are used in subsequent message requests are parameterized and stored as a variable.

A session template is created comprising the logic for extracting a single value that needs to be parameterized as a variable (e.g., a property) to be applied to subsequent requests. The tool also allows a user to selectively collect a group or bundle of session templates into a package for use during run-time of a load test. At run-time, the stored variable is then substituted in the identified message requests that require a correct, dynamic value sent back to the website server. The application program or session template wizard described in the present disclosure also allows a user to edit a previously created session template package.

In another embodiment, in addition to allowing a user to create a session template package comprising one or more session templates, the wizard also allows a user to apply a previously created session template package (e.g., without performing the scan) to a different message clip. In still another embodiment, the wizard provides a user with the ability to create an individual session template FIG. 1 illustrates an example high level architectural diagram showing a load test being conducted on a target website 12, which includes a plurality of web servers 17 coupled to Internet cloud 15 through a load balancer 18 and a firewall 19. Web servers 17 are interconnected with a plurality of application servers 16 and a plurality of database servers 14.

Target website 12 is shown connected to a public cloud 11 via Internet cloud 15a. Public cloud 11 includes a main instance 23 coupled to a database 24. Database 24 may be used to store test results, store metadata indicative of the test definition, and to store monitoring data (e.g., CPU metrics) generated during the load test. Main instance 23 is also shown coupled to a pair of analytic servers 22 and a plurality of load servers 21 within cloud 11, consistent with a snapshot view of the start of a process of deploying a test grid utilized to run the load test. It is appreciated that cloud 11 may comprise multiple clouds associated with multiple different cloud providers. In the example shown, main instance 23 is a virtual machine deployed on a server provided in cloud 11 that communicates with a browser application. In one embodiment, main instance 23 may include a results service (designated as a "reader" results service, as opposed to all of the other remote, "writer" results services) which reads data from database 24 and serves it to a web application, which in turn formats the data and serves it to an analytic dashboard in the browser. In operation, main instance 23 executes the coded sequence of computer executed steps (e.g., from code stored in a memory) that allocates the server resources required for the test across one or multiple different cloud providers. The same application that allocates/verifies server resources may also verify that the allocated servers are operational to conduct the website load test. The main instance may also execute code that implements load test results aggregation steps and storage of results data in database 24.

Connected to the front-end of cloud 11 through Internet cloud 15 is a laptop computer 20 associated with a user who may orchestrate deployment of the test on the target website 12. It is appreciated that in other implementations, computer 20 may comprise a desktop computer, workstation, or other computing device that provides a user interface that allows a user to create and execute the test composition, define the parameters of the grid, initiate the load test, analyze/review results of the load test in real-time, and launch the session template wizard described herein. Persons of skill in the cloud-computing arts will appreciate that the user interface may be web-based so it can be accessed from any computer having web-browser capabilities from any location in the world, without installation of specialized software.

Persons of skill in the art will further understand that the software which implements main instance 23 may also be downloaded to the user's laptop computer 20 or implemented on a separate hardware appliance unit located either at the user's premises (e.g., behind the firewall) or anywhere in clouds 15 or 11. It is further appreciated that laptop 20 is representative of a wide variety of computer devices, such as workstations, personal computers, distributed computer systems, etc., that may be utilized by the user to launch the method for provisioning/running the cross-cloud test grid, analyzing streaming real-time results, monitoring the performance of the actual load test, collecting and storing load test results data, as well as running the wizard used to scan message clips and create one or more session templates to be applied at run-time to the same or a different load test.

Continuing with the example of FIG. 1, an application program running on main instance 23 operates to create a graphical user interface (GUI) that allows a user of laptop 20 to remotely interact with the application, view/monitor the test results in real-time, and modify parameters/test conditions dynamically during the actual test. The same or different application program running on main instance 23 operates to provide a GUI for creating a session template or package of session templates. (For purposes of the present disclosure, the session template package wizard is considered synonymous with the application program or system program that performs the method and operations described herein.) In another embodiment, the session template package wizard may be run on a different computer or processor-based system.

The overall testing process begins with the user creating a sophisticated test plan or composition via a GUI of either the same application program running on main instance 23 or a GUI associated with another web browser application. The GUI may be utilized that generate complex parallel message streams comprising a plurality of message clips for website testing. In one example, the test plan may be created in the form of a visual message composition (analogous to a music composition) for testing web sites, web applications, or web services, such as that described in U.S. Pat. No. 7,844,036.

Once the test has been defined and the parameters set (e.g., number of servers, server locations, etc.) via the grid wizard, upon user input, the user main instance 23 may initiate the process of actually deploying and allocating the specified resources needed to execute the test composition by interacting with an application programming interface (API) of one or more cloud providers. For reasons of clarity, an array of just fifty-four interconnected load servers 21 are shown allocated per each result server 22 in the example of FIG. 1. It is appreciated, however, that the system and method described herein is highly scalable and capable of deploying/allocating a massive amount of resources including hundreds or thousands of load servers as well as a corresponding portion or ratio of result servers, depending on the parameters specified by either the user or system prior to deployment of the grid.

Figure 2:
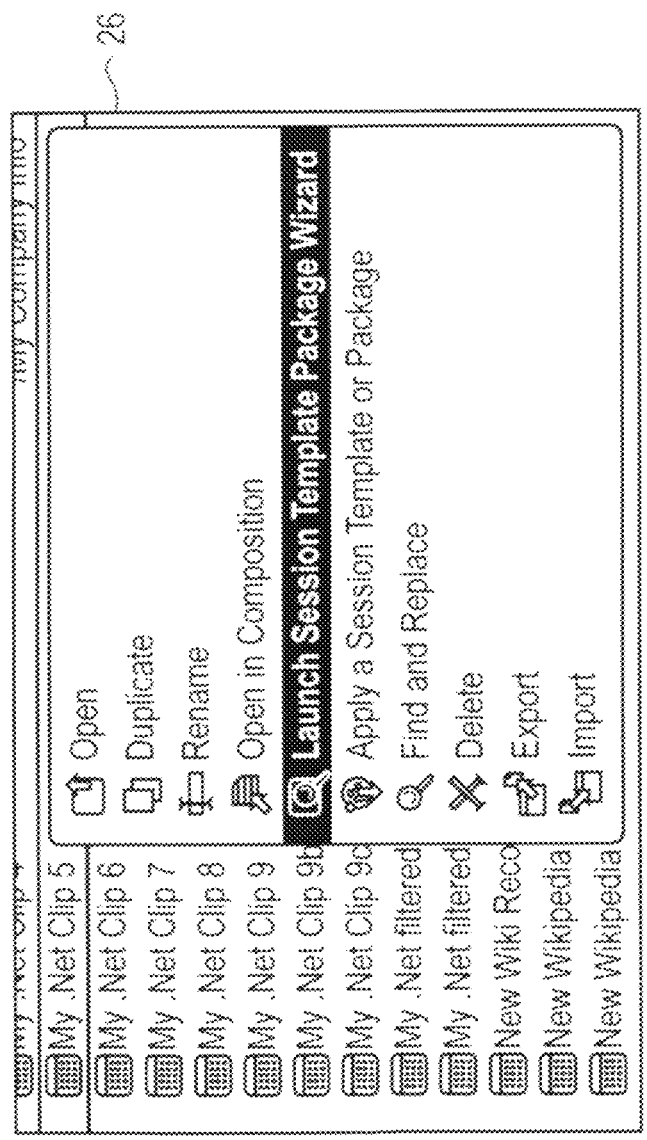
FIG. 2 is an example graphical user interface window showing a menu of options presented to a user for launching a session template package wizard.

FIG. 2 is an example graphical user interface window 26 showing a menu of options presented to a user for launching a session template package wizard. In one embodiment, a session template can be created from a message response's selected text using the session template package wizard shown in window 26 from within a message editor component of a GUI used for creating a test composition. In another embodiment, a test clip may also be selected from a test clips list component, with the actual string to search for being specified from within the session template wizard. In the example of FIG. 2, the session template package wizard is shown being launched from a test clips list by selecting a test clip and then right-clicking (e.g., using a mouse or other user input selection device) to select the Launch Session Template Package Wizard command (shown highlighted in window 26). Existing session templates or session template packages may also be applied using the Apply a Session Template or Package command.

Figure 3:
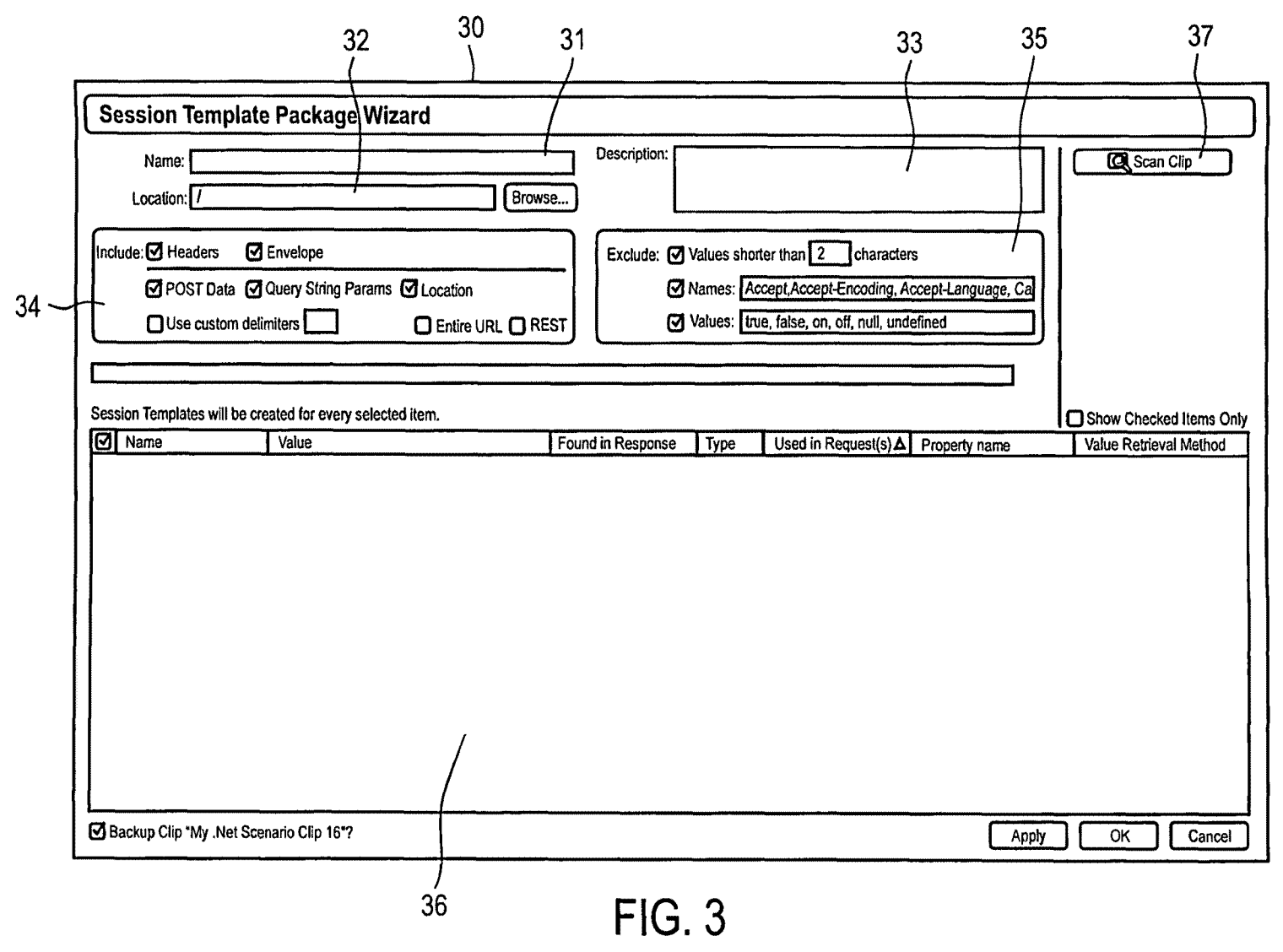

FIG. 3 illustrates an example graphical user interface window 30 that presents a user with a number of options following the launching of the session template wizard. In the example shown, the wizard allows a user to create a session template package, with each session template comprising the logic behind how to extract and substitute values. As discussed above, a package is a collection of templates, with each template being used for a single value extraction and a set of substitutions. In other words, the session template package wizard allows a user to create a collection of different value extractions and substitutions. Note that in one embodiment, while the session template package wizard runs, the program used to create and/or run the load test composition on the target website maintains a draft of the original test clip. If the template is applied, the original test clip is then renamed with the date/time appended to it such that the parameterized clip keeps the original name.

As can be seen, a data entry field 31 allows the user to assign a name to package that is to be created. In field 32, the user may specify a file location where the package is to be stored. Description field 33 provides the user with the option of creating a free-form description of the package. Include and exclude fields 34 and 35 respectively allow the user to specify (e.g., by checking the appropriate boxes) the things or items searched for, and not searched for, in the clip. These fields can be changed prior to each scan that is performed on the clip. Note that scanning does not change the clip being scanned; rather, it provides the user with a list of name/value pairs so an intelligent determination can be made as to what value needs to be parameterized as a variable, i.e., create a session template for.

As shown in the example of FIG. 3, include field 34 lists five different options at a high level, all of which are shown checked or selected. For instance, in this example the clip scan includes HTTP headers from the recorded responses, envelope nodes and attributes (e.g., SOAP, REST, etc.), POST data associated with a message, Query string parameters, and location. When the location box is checked, the user may select either or both of two different options: the entire URL and REST parameters.

The exclude field 35 delimits the scan by excluding those items indicated. In this example, values shorter than two characters (default case) are excluded, as well as certain specified HTTP header names and listed parameter values. Alternately, a user may check "Use a custom delimiter" to introduce a custom delimiter from a given environment. Name/value pairs are commonly delimited by standard alphanumeric characters such as an ampersand (i.e., "name=value&name=value") or semicolon (i.e., "name=value;name=value". Using a custom delimiter allows for parsing of requests to look for name/value pairs between specific, non-standard, custom delimiters.

It is appreciated that other embodiments may include a variety of different options in addition to or as an alternative to those shown.

When the user is finished entering information and selecting the options shown in the various fields, they may click on scan clip button 37 to start automated scanning of the clip. The name/value pairs produced as a result of the scan are then listed in field 36 at the bottom of window 30. Once clicked, scan clip button 37 becomes inactive and the scan begins. Scanning comprises an automated (computer-implemented) process wherein the wizard program goes through an entire clip message-by-message, each message having a request and a response, to look for values identified first in a message response and found in at least one subsequent request, based on the options and scanning delimiters selected. After the clip has been scanned, button 37 automatically becomes re-enabled in the event that either include field 34 or exclude option field 35 is changed.

Figure 4:
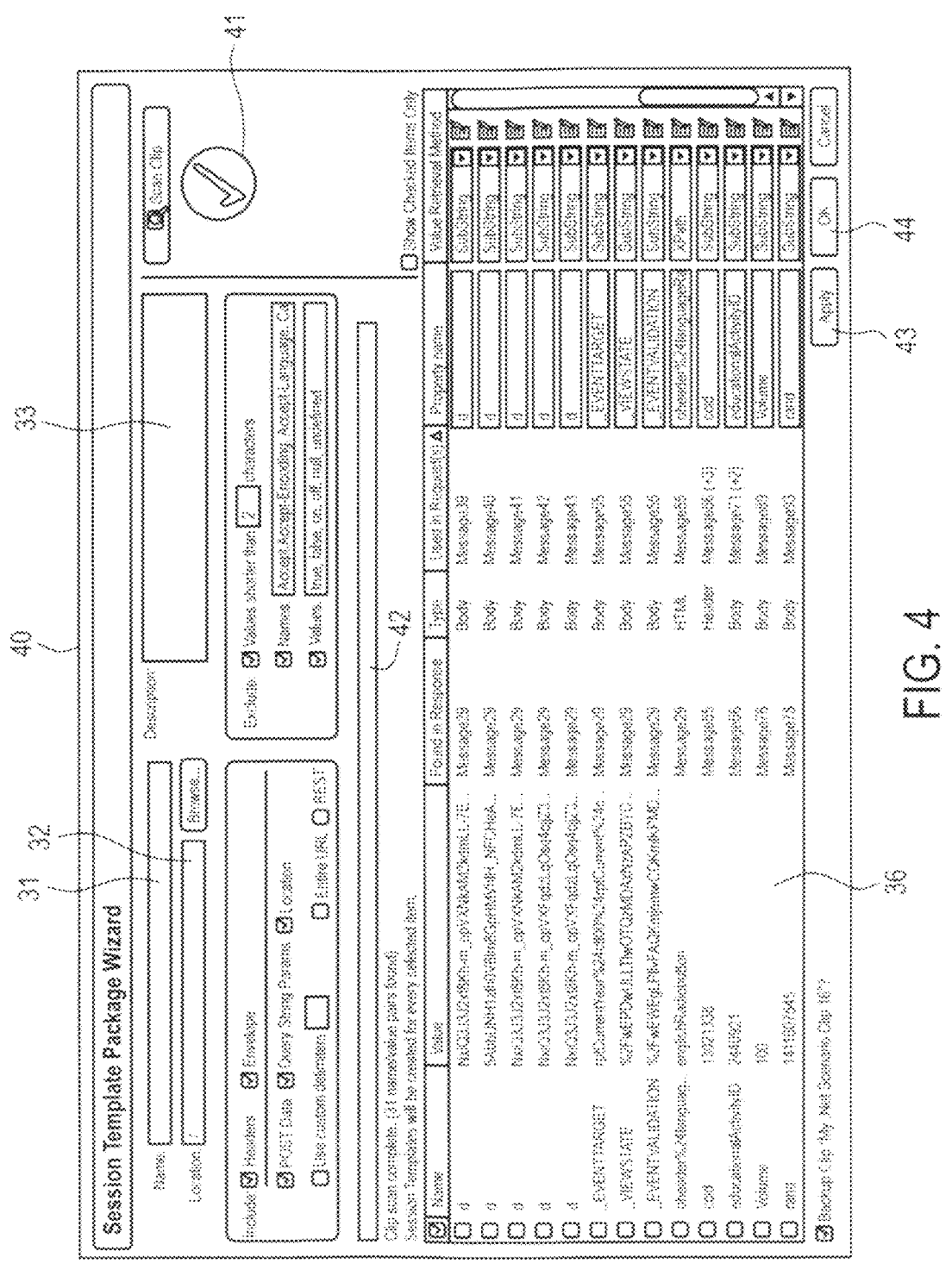

FIG. 4 is an example graphical user interface window 40 that shows field 36 populated with thirty-one name/value pairs found as a result of automated scanning of a clip. During the scanning process, progress bar 42 advances from left to right as the table in field 36 gets populated. After the scan, a checkmark icon 41 appears in the upper right-hand portion of window 40. Each row shown in field 36 lists a single name/value pair that was found during the scan. Note that the values listed typically are very long GUID strings. Rows whose names have values for suggested replacement may be checked.

In the embodiment shown, the scan results are presented in rows having the following column entries: Name, which is assigned by the wizard based on the property name (found in column 6). This name is used to refer to the associated name/value pair in the session template package and in any subsequently produced template lists. Value, which corresponds to the string found (e.g., the value for a location may be a relative URL. The "Found in Response" message is the suggested extraction point because it is closest to the first message where the name/value pair is used. In one embodiment, the extraction point may be set on a previous message by expanding ("clicking on") the name/value pair row, which reveals all message responses where the value is found.

Used in Request(s) is the clip component where the name/value pair is first used by the clip. For instance, a value or property that is found in Message29 may not be used until a subsequent Message43. Property Name is the name of the Custom Property which will be created for each virtual user, to dynamically store the value retrieved from the response and substituted into subsequent requests. This is distinct from the assigned name in column 1 although the value may be the same. Value Retrieval Method indicates the method(s) used to extract the value. Each row also has a Value Retrieval Method and an Edit button. In the embodiment shown, the value retrieval method types include: Substring parsing, JSON (JavaScript Object Notation), XPath (the XML Path Language), New Script, which allows a user to define a new script to be used for extraction, and Existing Script, which specifies use of a previously-defined script.

Figure 5:
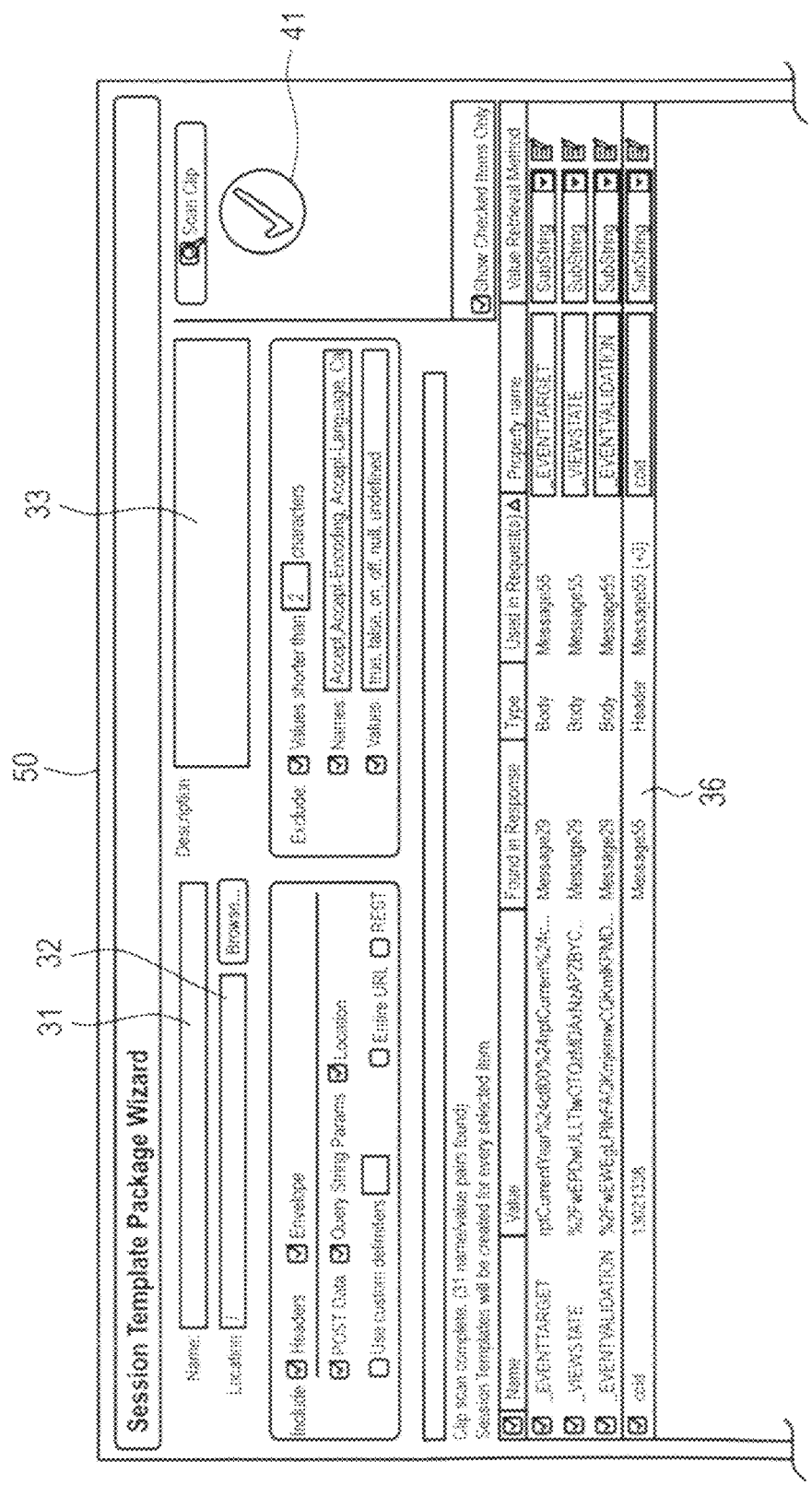
FIG. 5 is an example graphical user interface window showing a filtered set of name/value pairs found after automated scanning of a clip.

In reviewing the scan results the user may check the left-hand box of any row to add it to the session template package, or click the corresponding edit icon (on the right-hand side of field 36) to make changes to the selected value retrieval method. For example, a user may click on the edit icon for a row to view or change details for the Substring or to review or edit the XPath detected by the scan. In one implementation, the row is checked automatically when changes are made via either the XPath Editor or Substring Parser windows. Optionally, the user may check the Show Checked Items Only box located just below icon 41 to narrow the list displayed to only those items (i.e., values) selected for replacement. FIG. 5 is an example graphical user interface window 50 with the Show Checked Items Only box checked, such that only four checked name/value pair out of thirty-one total name/value pairs found are listed in field 36.

Clicking the "OK" button 44 saves the session template package using the specified name, folder location, and description provided in respective fields 31-33. Once the settings for each checked row are satisfactory, the user may click the "Apply" button 43. That is, when the user clicks on button 43, all checked rows are sent to the server. Then, working on a draft of the clip, the session template package wizard creates clip-level custom properties, and adds the corresponding message-level property paths that utilize them, as well as the property sets. Progress bar 42 indicates the real-time status as the specified values are applied to the draft clip. In other words, applying the session template package means that all of the dynamic values received from the website server are parameterized such that all subsequent message requests contain the correct dynamic values that are to be sent to the website server. Clicking "OK" button 44 again renames the original clip and promotes the draft to the original clip name, thereby completing the process and exiting the wizard.

In sum, the session template package wizard provides a user with a GUI that allows them to define what value will be extracted, how it is to be extracted, from where in the message clip it will be extracted, stores it in a variable, and then use the value from the variable in subsequent messages. Creating session templates, in this sense, involves creating and storing the logic used to properly extract values. At run-time, this logic is applied such that all of the dynamic values received from the target website are properly extracted and substituted in all other subsequent requests that require the value be sent back to the website server.

Persons of skill in the art will appreciate that the session template package need only be applied once to the clip. The clip can then be placed in a Composition, and multiplied many times to simulate a very large number of virtual users. In other words, when a load test composition plays out as a thousand virtual users on a target website, the load servers running the composition will send requests to website server (s) with dynamically changing values such that the website server(s) will think there is a different browser running for each one of the virtual users. It is further appreciated that the individual session templates, as well as an entire session template package, may be applied to other clips.

Figure 6:
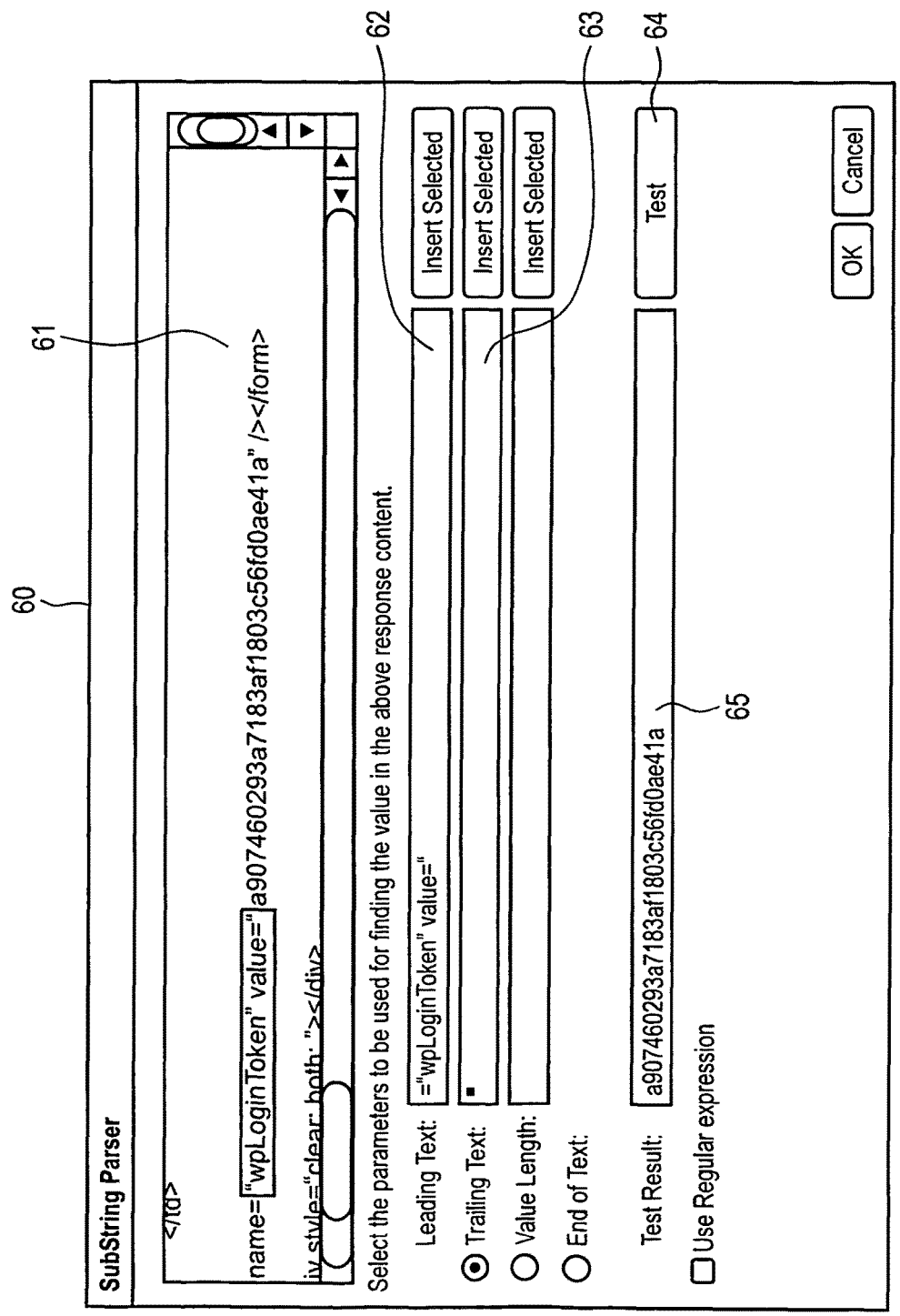
FIG. 6 is an example graphical user interface window showing various options presented when Substring parsing is selected as a value retrieval method during scanning.

FIG. 6 is an example graphical user interface window 60 showing various options presented to a user when Substring parsing is selected as a value retrieval method during scanning of a clip. In this example, window 60 comprises a dialog box 61 that shows the recorded responses for a given clip run as part of a load test of a target website. Beneath dialog box 61 are a set of data fields that provide the user with the option of specifying various "anchors" or parameters for use in extracting values during automated scanning. (An "anchor" in the context of the present disclosure is some attribute or string in a message that bounds or characterizes a value to be extracted, and which does not change between responses.) In one embodiment, the user may invoke Substring parser window 60 by first locating a row of a name/value pair of interest in results field 36 (see e.g., FIG. 5) and then selecting Substring as the value retrieval method. With Substring selected as the value retrieval method for the row, the user may then click the edit button on the right-most end of the row.

Leading Text and/or Trailing Text may optionally be specified to delimit the Substring search by first selecting the given text to use and then clicking the corresponding "Insert Selected" button shown on the right-hand side of window 60. Leading Text field 62 specifies any leading text before the string to include in the search. Similarly, Trailing Text field 63 specifies the trailing text which denotes the end of the value to extract.

For instance, in the example of FIG. 6 the user has selected a leading text string (="wpLoginToken" value=") and a trailing text string (") for substring parsing, as shown in fields 62 and 63, respectively. Clicking on the Test button 64 tests the current selections and produces a test result in field 65, which in this case is the dynamic value extracted (i.e., "a907460293a7183af1803c56fd0ae41a"). Other anchor options that the user may specify for Substring parsing include value length (e.g., 32 characters long) and End of Text. In yet another embodiment, when the value to be extracted occurs in an HTTP Response header, the user may choose the name of the HTTP Response header in which the string occurs (not shown in FIG. 6). Still other embodiments may include other additional extraction options.

In the embodiment shown in FIG. 6 the user is also given the additional option of specifying a regular expression for use in extracting values. An example where a user may wish to utilize a regular expression is a situation where the trailing text of a value is known to be dynamic (non-fixed), or where the value to be extracted is found in free-form text sent back from the website server.

As discussed previously, other value retrieval method options include extracting values from a JSON object, XPath, defining a New Script for extracting values, or using an Existing Script taken from a stored library of scripts. It is appreciated that in various embodiments the session template package wizard may provide separate GUI editor windows for specifying, reviewing, revising and testing the parameters, values, and/or expressions specified. For example, an XPath editor window may allow a user to edit XPath values, which may then be tested in the manner described above to ensure that the XPath is valid (i.e., it captures the extracted value within the given XPath in a Test Result field). A New Script editor window may include a dialog box or field used to specify parameters for generating a script to replace a specified value.

Persons of skill in the computing arts will appreciate that each clip can contain hundreds or even thousands of messages, and for each one there may be a great multitude of name/values pairs. And for each name/value pair, the wizard described herein searches back on all of the previous messages to find where the value first appeared. Thus, if performed in a conventional sequential manner according to a prior art approach the scanning operations described herein would result in exceptionally long run-time, such that a single scan may take one or more hours to complete. In one embodiment, the session template package wizard is able to complete the operations involved in scanning of a clip in seconds or a few seconds, even for clips with thousands of messages, thereby greatly enhancing the usefulness of the software tool.

One of the ways that the session template package wizard program is able to perform such a massive search through large numbers of messages in such a short amount of time as compared with prior art methods is by executing all of the tasks involved in parallel, using multiple threads. In the context of the present disclosure, a "thread" refers to information associated with a single individual computing task, process, or a particular service request. The session template package wizard computer program is configured to execute multiple threads—all in parallel—thereby allowing the program to execute many search actions at one time.

In the multi-threaded architectural approach, a list of name/value pairs may be built or constructed in one thread. Once the list of name/value pairs has been thus created, a determination of valid "hits" may proceed in a multi-threaded manner wherein all of the search tasks are performed in parallel. For example, after a list of name/value pairs has been built, the automated program may use multi-threading to determine whether each distinct value that was found in a message clip was used in a prior request with the name stored in a given session template. A new thread may be created and placed in the thread pool corresponding to each given value for which a search is to be performed. In other words, each thread corresponds with a starting message in the algorithm described herein. By way of further example, if it is found that Message10 in a clip contains one or more name/value pair hits, then that results in one thread being generated. Execution of that one thread produces a search through all previous messages (i.e., Message1-Message9) for every name/value pair found in Message10. This approach enables rapid build-up of the list of name/value pairs.

In one embodiment, in addition to the use of multi-threading for scanning to extract values, multi-threading may also used during the application of a template or package of templates to a clip. In other words, multi-threading may also be utilized to perform variable substitutes in all of the other message requests that require a dynamic value returned to the website server.

In still another embodiment, instead of scanning a clip to build a list of name/value pairs that results in the creation of a package of session templates, a wizard or coded program, which, when executed, generates a GUI that allows a user to create an individual session template. The wizard for creating an individual session template starts from a single response and allows the user to select a certain value found in that response, basically bypassing all of the name/value pair creations. Using the value selected in the given response, the wizard then proceeds in the same manner described above with respect to the session template package wizard, except that only a single template is created comprising the logic for extracting the certain value, storing it as a variable, which variable can then be substituted or replaced in those subsequent responses that need to use it.

An individual session template that has been created and stored in the repository can then be added to a package. In other words, session template packages are editable.

Figure 7:
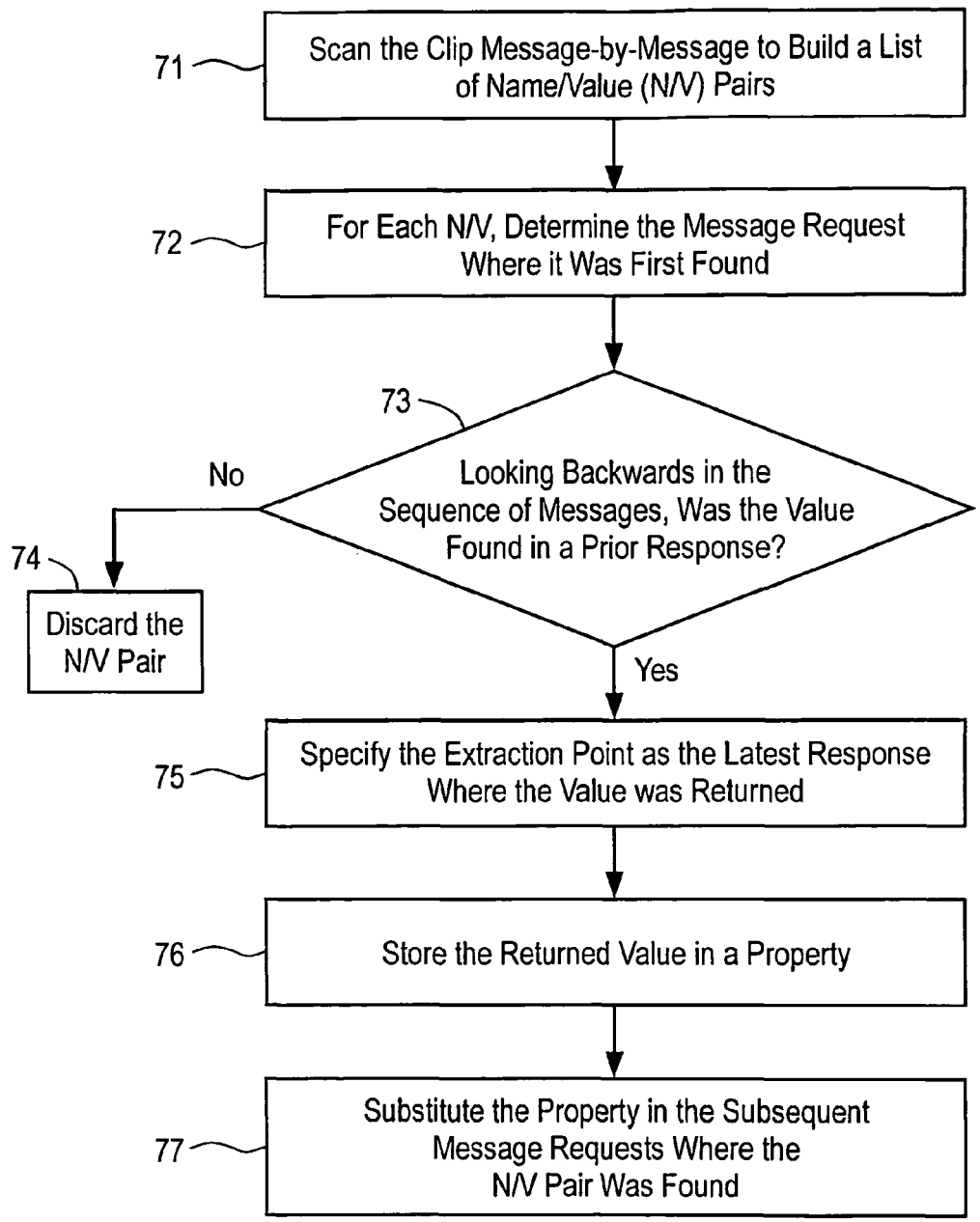
FIG. 7 is an example flow diagram of a sequence of steps for automated scanning of a clip to create and apply a session template package.

FIG. 7 is an example flow diagram of a sequence of steps for automated scanning of a clip to create and apply a session template package. Once the process begins, the clip is scanned message-by-message to identify and locate name/value pairs that satisfy the user-selected search criteria and methods. As shown in block 71, scanning produces a list of name/value pairs found in the clip. For each name/value pair found, the computer program then determines the message request in the clip where the name/value pair first appears (block 72). Next, for each of the name/value pairs the wizard looks backwards in the sequence of messages to determine whether the value was found in a prior response from the server (block 73). If not, the name/value pair is discarded as an invalid hit (block 74).

The extraction point is specified as the latest response where the value was first returned (block 75). The returned value is then stored as a property (block 76). That is, a template is created that includes the logic for extracting that particular dynamic value found at that particular message response in a clip. The property is then substituted in the subsequent message requests where the name/value pair was found (block 77).

Figure 8:
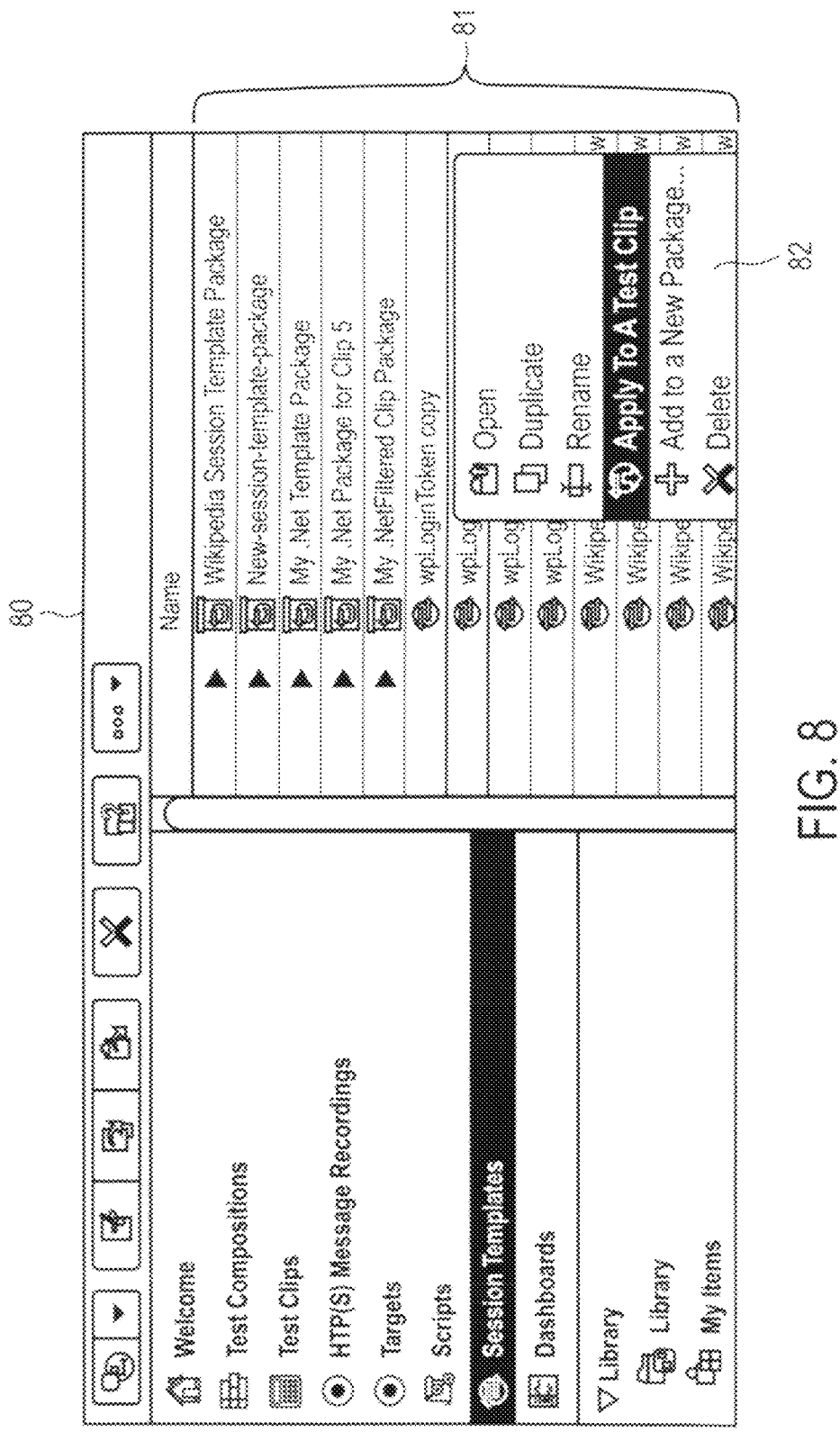
FIG. 8 is an example graphical user interface window illustrating how session templates and packages may be applied to a Test Clip from a centralized view showing all session templates and packages in a manner similar to viewing a folder list in an operating system.

FIG. 8 is an example graphical user interface window 80 showing how session templates and packages may be managed in a manner similar to viewing a folder list in an operating system. In the example shown, a user has highlighted or otherwise selected the Session Templates folder entry on the left-hand side of window 80, which results in the opening of the contents of that folder in field 81 on the right-hand side. This example further shows that the user has right-clicked on a particular session template package, thereby opening field 82 which provides a list of actions to be taken with respect to the selected session template package. In this case, the user has positioned the mouse cursor or utilized another input device to highlight the "Apply To A Test Clip" option in field 82. At this point, the user may left-click to apply the package to a clip.

Figure 9:
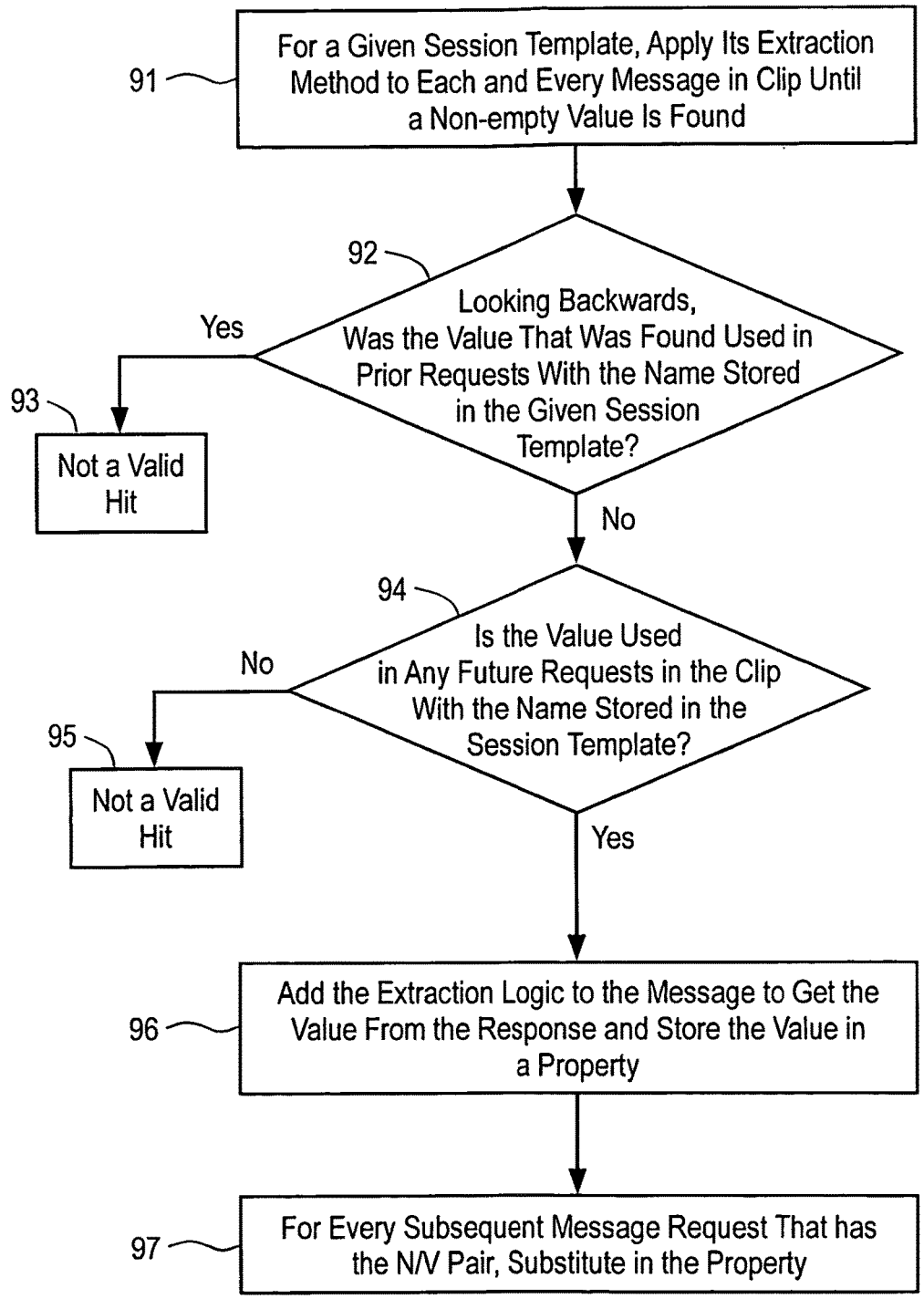
FIG. 9 is an example flow diagram of a sequence of detailed steps for a method for applying a session template package to a message clip.

FIG. 9 is an example flow diagram of a sequence of detailed steps for a method for applying a session template package to a message clip. The method begins in block 91 with the step of applying, for a given session template, the extraction method to each and every message in a clip until a non-empty value is returned. As its name implies, a non-empty value refers to a string that is not empty. For example if no match is found, the extraction logic will return an empty string, or "not-a-hit". At block 92, the program looks backwards (in the sequence of messages that form a clip) to determine whether the value that was found was used in prior requests with the name stored in the given session template. If so, then the value found is not a valid hit, i.e., it is discarded (block 93). If the value was not used in a previous request in the sequence, a search is performed to determine whether the value is used in any future (i.e., subsequent) requests in the clip with the name stored in the session template (block 94). In the event that the value is not used in a future request, then that value is discarded as not being a valid hit (block 95).

On the other hand, in the case where the value is used in at least one future request in the clip, the extraction logic is added to the message to get the value from the response. The value is then stored as a property. (block 96) Lastly, the property is substituted for every subsequent message request that has the name/value pair (block 98).

FIG. 10 shows an example graphical user interface window 100 that displays the results following the application of a session template package comprising two session templates to a test clip. As shown, the summary information is shown as a pair of rows, each corresponding to one of the templates applied. Column entries in each row include Template Name, Name (which will be the created Custom Property's name), Extracted Value, Found in Response (which is the response of the message in the clip where the dynamic value was extracted from), and Used in Request(s) (each of the future or subsequent message requests where a substitution was made).

Person of skill in the art will appreciate that once a package has been created containing all of the specified session templates, with each session template including the logic on how to extract a single value and store it in a property to substitute into subsequent requests, that package can be applied to another recording for the same website without having to perform further scanning. In other words, a user need only right-click on the Apply To A Test Clip option in field 92 to apply the package of templates to the load test. In addition, for customers that are using well-defined frameworks like SAP, Oracle applications, and the like, session template packages can be pre-created for them and shipped within the product. In other words, a user need only execute a few clicks (e.g., of a mouse) to apply the package to a set of clips.

Figure 11:
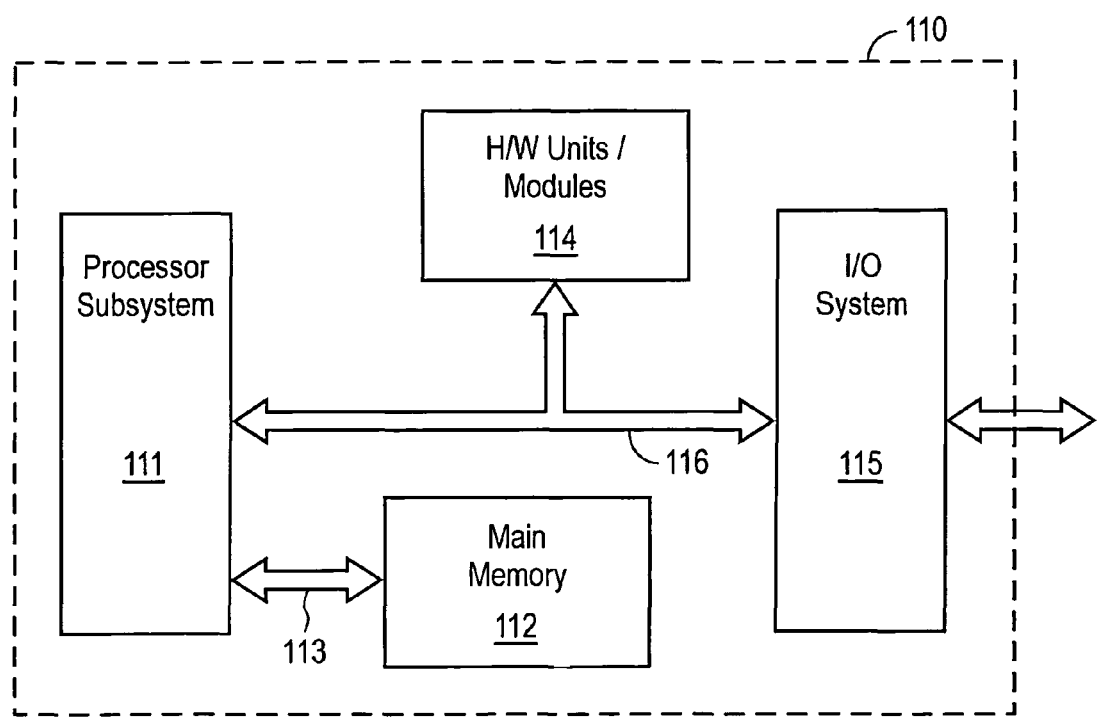
FIG. 11 is a generalized circuit schematic block diagram of a network node.

FIG. 11 shows an example network node 110, which may comprise any of the computers, servers, or electronic processing devices coupled with a communications network, as described herein. Node 110 typically comprises a number of basic subsystems including a processor subsystem 111, a main memory 112 and an input/output (I/O) subsystem 115. Data is transferred between main memory ("system memory") 112 and processor subsystem 111 over a memory bus 113, and between processor subsystem 111 and I/O subsystem 115 over a system bus 116. Examples of the system bus may include the conventional data transport (or hyper transport) bus and the conventional peripheral component interconnect (PCI) bus. Node 110 may also comprise other hardware units/modules 114 coupled to system bus 116 for performing additional data processing, algorithmic or communication functions. Alternatively, these functions may be performed by one or more processors of subsystem 111. Processor subsystem 111 typically comprises one or more processors and a controller device that incorporates a set of functions including a system memory controller, support for one or more system buses and memory access engines.

It should be understood that elements of the disclosed subject matter may also be provided as a computer program product which may include a machine-readable storage medium (e.g., a memory) having stored thereon instructions which may be used to program a computer (e.g., a processor or other electronic device) to perform a sequence of operations. Alternatively, the operations may be performed by a combination of hardware and software. The machine-readable storage medium may include, but is not limited to, floppy diskettes, optical disks, CD-ROMs, and magneto-optical disks, ROMs, RAMs, EPROMs, EEPROMs, magnet or optical cards, or other type of machine-readable medium suitable for storing electronic instructions.

Additionally, although the present invention has been described in conjunction with specific embodiments, numerous modifications and alterations are well within the scope of the present invention. Accordingly, the specification and drawings are to be regarded in an illustrative rather than a restrictive sense.

We claim:

1. A computer automated method for creating a session template comprising:
    automatically scanning a clip of messages that includes message requests and message responses arranged in a sequence, the clip being utilized to perform a load test on a target website server, the load test comprising communications from a plurality of virtual users to the target website server, the communications being maintained through the exchange of tokens during running of the load test, the scanning being performed based on one or more search parameters and producing a list of one or more name/value pairs, each name/value pair having a corresponding value which comprises a token used for authentication of a virtual user, the corresponding value produced by the target website server changing over the sequence;
    for each name/value pair in the list:
        identifying a message request in the clip where the corresponding value is first found;
        looking backwards in the sequence from the message request where the corresponding value is first found to locate one or more prior message responses where the corresponding value is found;
        specifying an extraction point in the clip for the corresponding value as a latest message response in the sequence where the corresponding value was returned from the target website server;
        storing the corresponding value as a variable of the session template, wherein at run-time of the load test the stored variable of the session template being applied to subsequent message requests that require a correct dynamic value sent back to the website;
    bundling a plurality of session templates into a session template package; and
    applying the session template package to the clip.

2. The computer automated method of claim 1 further comprising providing a user interface (UI) that allows a user to specify the one or more search parameters prior to the scanning of the clip of messages.

3. The computer automated method of claim 1 wherein the variable is stored in a machine-readable storage medium.

4. The computer automated method of claim 1 further comprising substituting the variable in subsequent message requests in the sequence after the extraction point where the value is found.

5. The computer automated method of claim 1 further comprising discarding the name/value pair in the event that the corresponding value is not found in a message response prior to the message request where the corresponding value is first found.

6. A computer program product comprising a non-transitory computer-readable medium encoded with programmed instructions, execution of the programmed instructions by a computer operable to:
    automatically scan a clip of messages that includes message requests and message responses arranged in a sequence, the clip being utilized to perform a load test on a target website server, the load test comprising communications from a plurality of virtual users to the target website server, the communications being maintained through the exchange of tokens during running of the load test, the scan being performed based on one or more search parameters and producing a list of one or more name/value pairs, each name/value pair having a corresponding value which comprises a token used for authentication of a virtual user, the corresponding value comprising a dynamic value produced by the target website server, the dynamic value changing over the sequence;
    for each name/value pair in the list:
        identify a message request in the clip where the corresponding value is first found;
        look backwards in the sequence from the message request where the corresponding value is first found to locate one or more prior message responses where the corresponding value is found;
        specify an extraction point in the clip for the corresponding value as a latest message response in the sequence where the corresponding value was returned from the target website server;
        store the corresponding value as a variable of a session template, wherein at run-time of the load test the stored variable of the session template being applied to subsequent message requests that require a correct dynamic value sent back to the website;
    bundle a plurality of session templates into a session template package; and
    apply the session template package to the clip.

7. The computer program product of claim 6 wherein execution of the programmed instructions by the computer is further operable to provide a user interface (UI) that allows a user to specify the one or more search parameters prior to the scanning of the clip of messages.

8. The computer program product of claim 6 wherein the variable is stored in a machine-readable storage medium.

9. The computer program product of claim 6 wherein execution of the programmed instructions by the computer is further operable to substitute the variable in one or more subsequent message requests in the sequence after the extraction point where the name/value pair is found.

10. The computer program product of claim 6 wherein execution of the programmed instructions by the computer is further operable to discard the name/value pair in the event that the corresponding value is not found in a message response prior to the message request where the corresponding value is first found.

\* \* \* \* \*